(12) United States Patent
Clüsserath et al.

(10) Patent No.: US 10,766,753 B2
(45) Date of Patent: Sep. 8, 2020

(54) FILLING ELEMENT WITH AN OSCILLATING BODY A MEASUREMENT DEVICE

(71) Applicant: KHS GmbH, Dortmund (DE)

(72) Inventors: Ludwig Clüsserath, Bad Kreuznach (DE); Dieter-Rudolf Krulitsch, Bad Kreuznach (DE); Matthias Damerow, Uelversheim (DE)

(73) Assignee: KHS GmbH, Dortmund (DE)

( * ) Notice: Subject to any disclaimer, the term of this patent is extended or adjusted under 35 U.S.C. 154(b) by 66 days.

(21) Appl. No.: 16/080,746

(22) PCT Filed: Mar. 2, 2017

(86) PCT No.: PCT/EP2017/054936
§ 371 (c)(1),
(2) Date: Aug. 29, 2018

(87) PCT Pub. No.: WO2017/153256
PCT Pub. Date: Sep. 14, 2017

(65) Prior Publication Data
US 2019/0345015 A1 Nov. 14, 2019

(30) Foreign Application Priority Data

Mar. 8, 2016 (DE) .......................... 10 2016 104 185

(51) Int. Cl.
*B67C 3/26* (2006.01)
*B67C 3/28* (2006.01)
*G01F 23/296* (2006.01)

(52) U.S. Cl.
CPC ............ *B67C 3/26* (2013.01); *B67C 3/285* (2013.01); *G01F 23/2965* (2013.01); *G01F 23/2968* (2013.01); *B67C 2003/2685* (2013.01)

(58) Field of Classification Search
USPC ........................................................ 137/558
See application file for complete search history.

(56) References Cited

U.S. PATENT DOCUMENTS 4,787,427 A * 11/1988 Bacroix ................... B67C 3/08
141/198
5,578,994 A * 11/1996 Cherek ............... G01F 23/2967
137/386
2019/0127198 A1 * 5/2019 Ohrem ...................... B65B 3/22

FOREIGN PATENT DOCUMENTS

| DE | 37 03 658 A1 | 8/1988 |
| DE | 44 27 086 A1 | 12/1994 |
| DE | 199 44 814 A1 | 7/2000 |
| DE | 102011056370 A1 | 6/2013 |
| EP | 2 192 076 A1 | 6/2000 |
| EP | 1 571 119 A1 | 9/2005 |

* cited by examiner

*Primary Examiner* — Daphne M Barry
(74) *Attorney, Agent, or Firm* — Occhiuti & Rohlicek LLP

(57) ABSTRACT

A filling element includes a filling-level sensor having an oscillating body disposed to interact with fluid that is in a container being filled. A change in the oscillation of the body, triggered either electromechanically or by fluid flow, provides information indicative of filling level.

19 Claims, 3 Drawing Sheets

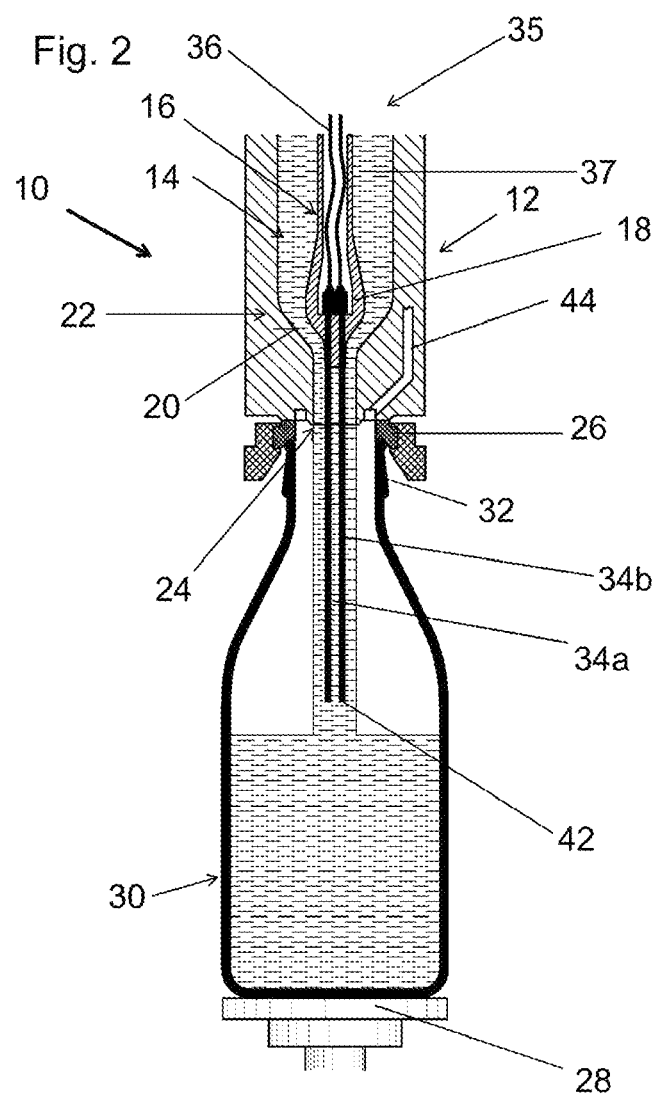

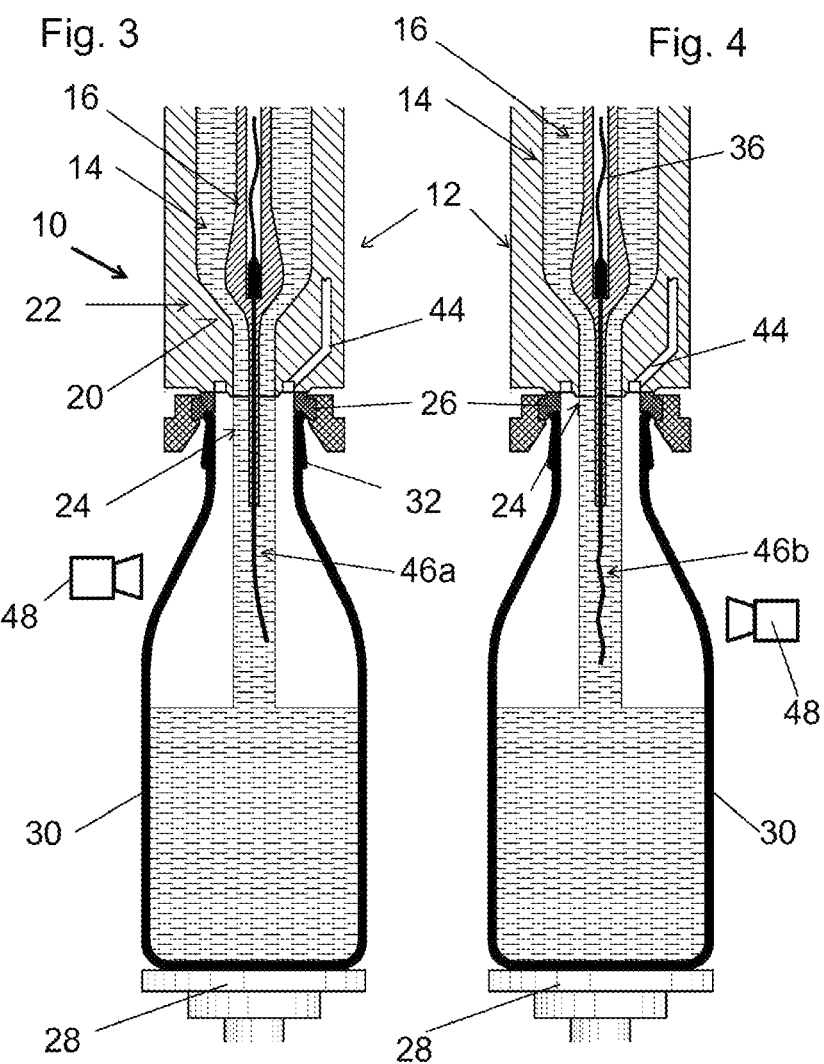

FILLING ELEMENT WITH AN OSCILLATING BODY A MEASUREMENT DEVICE

RELATED APPLICATIONS

This is the national stage of international application PCT/EP2017/054936, filed on Mar. 2, 2017, which claims the benefit of the Mar. 8, 2016 priority date of German application DE 102016104185.8, the contents of which are herein incorporated by reference.

FIELD OF INVENTION

The invention relates to filling elements, and in particular, to controlling the filling level.

BACKGROUND

In the mass production of beverages, it is usual to fill containers with a designated quantity of the beverage. A typical filling machine is therefore expected to control how much beverage is in the container.

One way to control the amount of beverage in a container is to weigh it as it is being filled. Another way is to fill it for a known time at a known volume-rate of flow. Yet another way is to introduce something analogous to a dipstick into the container so as to control the filling level. In these embodiments, it is important that there be a way to determine the filling level based on some interaction between the dipstick and the environment within the container's interior.

SUMMARY

In one aspect, the invention features a level sensor and a measuring device. The level sensor includes an oscillating body, such as a rod. It also includes a measuring device for measuring the oscillation of the oscillating body.

In some embodiments, fluid flow sets the oscillating body into oscillation. Examples of such fluid flow include flow of the beverage or flow of gas associated with flow of the beverage, for example gas emerging during the filling process.

In other embodiments, a separate excitation device, such as an electrical device, triggers oscillation.

The oscillating body oscillates independently of whether it is arranged in the filling jet or next to the filling jet. It does so at a defined frequency, such as at its resonance frequency. When the filling level in the container rises so as to substantially interact with the oscillating body, the oscillation frequency changes. This happens if, for example, the filling level just touches the lower end of the oscillating body. It also happens when the filling level rises past the lower end of the oscillating body, the oscillation frequency of the oscillating body changes.

A measuring device measures this frequency and provides it to an evaluator that is either allocated to the filling element or shared by plural filling elements of a filling machine.

The evaluator stores at least one reference value. This value represents a reference frequency of the oscillating body when the filling level has reached the lower end of the oscillating body or has risen to a predetermined height on the oscillating body. The evaluator compares the measured oscillation frequency with the reference frequency. If the evaluator determines that the reference frequency has been reached or exceeded, it causes the filling valve to close.

The oscillating body can be set in oscillation continuously or discontinuously, for example in pulses. With discontinuous operation, the interval between the pulses should be no greater than a hundred milliseconds and preferably no greater than ten milliseconds. These values have criticality because they have been found to promote sufficiently high precision in setting the filling level to meet the needs of the industry.

The excitation device preferably excites the oscillating body at its self-resonant frequency. An oscillation of this type is easily induced and clearly defined. A change in this self-resonant frequency is therefore easily detected when the filling level is high enough to interact with the oscillating body.

As it rises, the filling level influences the oscillation body's oscillation frequency. It is therefore useful for the evaluator to not only store a reference frequency but also to store a time-dependent frequency response. Doing so substantially improves the level sensor's reliability. It does so because the evaluator is able to rely not only on a change in frequency but also on a run-up frequency response that precedes it. Evaluation of these characteristics can even make it possible to detect defects in the bottle or defects in the filling process.

In some embodiments, the oscillating body includes an electromechanical transformer, such as a piezoelectric element. Such a piezoelectric element is easily driven into resonance, for example, by being exposed to a suitable alternating electric field. This can be carried out by providing electrodes across the piezoelectric element and connecting a voltage source to the electrodes. In some embodiments, the evaluator and the voltage source connect to the same electrodes. This permits excitation and evaluation to alternate with each other. However, in other embodiments, the piezoelectric element has two pairs of electrodes: one for the voltage source and another for the evaluator.

Embodiments include those in which the excitation device and the evaluator are integrated into an electronic circuit, which is either formed separately for each filling element or which is provided centrally in the filling machine for a plurality of filling elements such that the corresponding excitation device and evaluator can operate in multiplex mode.

In some embodiments, the oscillating body is configured as a rod. This is advantageous because such a shape both avoids obstructing the filling jet in any appreciable way while at the same time presenting a clearly defined resonance.

In some embodiments, the oscillating body extends centrally below the dispensing opening such that the filling jet completely surrounds it. In some embodiments, it is the filling jet that triggers oscillation. As a result, oscillation continues during the entire filling process at the self-resonant frequency.

In some embodiments, the oscillating body extends vertically downwards from the dispensing opening such that it projects well into the container without obstructing the filling jet.

In other embodiments, the oscillating body extends below the product channel and coaxial with the product channel. In this position, a filling jet that emerges from the dispensing opening completely surrounds the oscillating body. As a result, the filling jet is able to trigger oscillation without itself being disturbed in any significant way.

In yet other embodiments, an axially-movable valve element both holds the oscillating body and interacts with a valve seat formed in the product channel. Since the oscillating body is already suspended in the product channel itself, there is no longer a need to suspend it below the product channel.

In some embodiments, there exists a memory that stores oscillation responses corresponding to certain desired conditions. These are made available to an evaluator, and specifically, to a comparator of the evaluator. The evaluator then compares a measured oscillation with a stored oscillation response and uses the result of this comparison to derive a suitable actuation signal.

In some embodiments, the filling-element body has a contact surface on an underside thereof that serves as a sealing surface against which the container presses during pressure filling.

In an advantageous further embodiment, therefore, the oscillating body extends from the product channel to as far as below the dispensing opening.

In particular, if the oscillating body is arranged in the filling jet it is also possible, by way of the oscillation of the oscillating body, for irregularities in the filling jet to be detected and evaluated.

In some embodiments, the oscillation body is a piezoelectric element. In these cases, the oscillating body is a rigid body.

In other embodiments, the oscillation body includes a flexible element. Examples of a flexible element include a band or a reasonably thick thread. Among these embodiments are those in which a sensor detects oscillation. In some of these embodiments, the sensor is an optical sensor. In those cases in which the flexible element includes ferromagnetic material, a magnetic sensor can be used. Other examples include a Hall sensor.

A flexible element interacts a filling jet in such a way that the filling jet itself is what causes the oscillating body to oscillate at a natural frequency. When the filling level reaches the lower end of the flexible element, it changes this oscillation of the flexible element substantially. Such a change is easily detected by a sensor, such as an optical sensor, a magnetic sensor, an acoustic sensor, or other proximity sensor.

In some embodiments, the flexible element comprises or is coupled to a piezoelectric element, such as a polymer-based piezoelectric element. In such embodiments, measurement takes place by way of the contact electrodes coupled to the piezoelectric element.

In another aspect, the invention features a filling machine that comprises a plurality of filling elements as described herein. In some embodiments of the filling machine either one or both the evaluator and excitation device is provided centrally for all the filling elements. In others, it integrated into a control system of the filling machine.

In another aspect, the invention features a method that includes measuring the filling level measurement of a container filled by a filling element. The filling element comprises a product channel and a filling valve formed therein, as well as a dispensing opening at the lower end of the product channel, through which a liquid to be filled flows into through the container's mouth and into a container located below the dispensing opening. The filling element also includes an oscillating body arranged in the region below the dispensing opening such that it extends at least partially into the container. The oscillating body is set into oscillation during a filling process, either by an excitation device, by the filling jet of the liquid emerging from the dispensing opening, or by the escaping gas itself, these oscillations being measured by a measuring device. The method includes closing filling valve upon detection of a change in oscillation or upon occurrence of a change in the time-dependent response of the oscillating body.

In some practices, the method includes storing a reference oscillation, comparing it with a measured oscillation, and closing the filling valve based on the result of that comparison.

In some embodiments, there are two or more oscillating bodies. This provides some redundancy in measurement to promote greater reliability.

Embodiments include those in which the oscillating body is actually in the filling jet and those in which it is next to the filling jet. Generally, the lower end of the oscillating body defines the target filling level such that the filling process stops when the filling level just reaches the lower end of the oscillating body. However, in some embodiments, filling stops when the filling level reaches some other location on the oscillating body. For example, in some practices, filling stops when the lower end of the oscillating body has been immersed in between three millimeters and fifteen millimeters of liquid. Unlike conventional rods inserted into containers, the desired filling level is easily programmed by calibrating at a desired level and storing the resultant dynamic response for comparison with measured oscillation.

BRIEF DESCRIPTION OF THE FIGURES

These and other features of the invention will be apparent from the following detailed description and the accompanying figures, in which:

FIG. 2 shows an embodiment similar to that shown in FIG. 1 but with two oscillating bodies, FIG. 3 shows an embodiment that relies on an oscillating flexible element, and FIG. 4 shows an embodiment similar to that shown in FIG. 3 but with the flexible element being sufficiently elastic to undulate.

DETAILED DESCRIPTION

Figure 1:
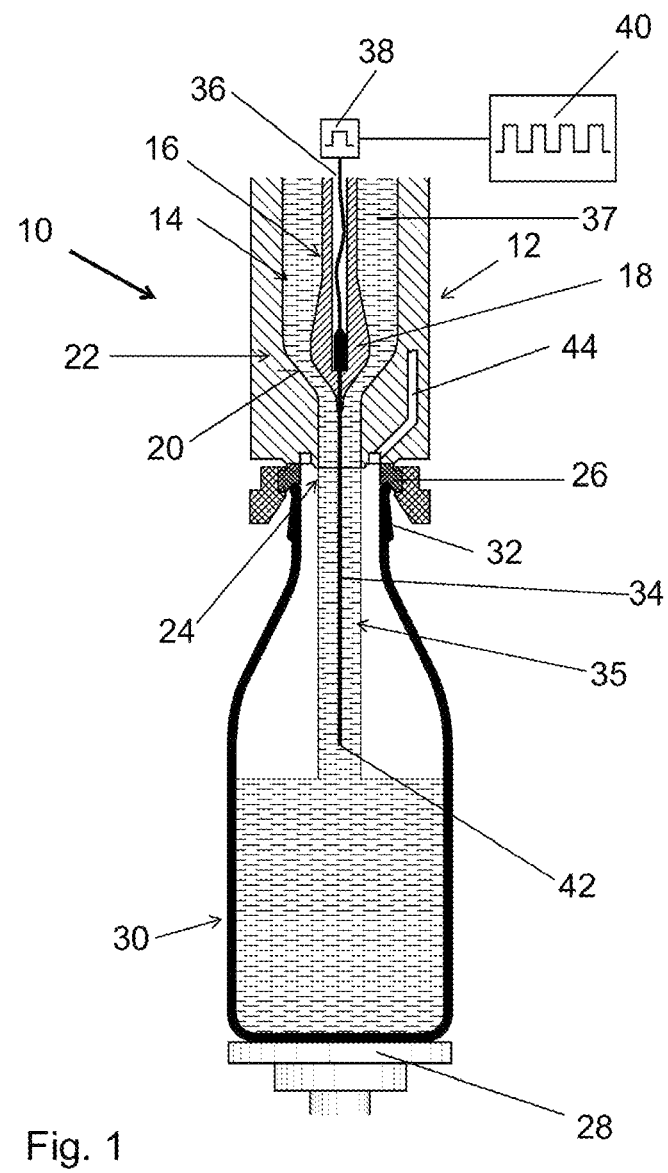
FIG. 1 shows filling element that relies on an oscillating body to determine fill level.

FIG. 1 shows a filling element 10 with a longitudinal filling-element body 12 through which a product channel 14 extends. An axially-movable valve-element 16 extends through the product channel 14. At its lower end, the valve element 16 has a thickened valve body 18 that interacts with a valve seat 20 defined by an inner wall of the filling-element body 12 that forms the product channel 14. Together, these define a filling valve 22.

A dispensing opening 24 at the lower end of the valve body 12 provides a way for a liquid filling-product, such as a beverage, to enter a mouth 32 of a container 30 that is standing on a retainer 28 of the filling element 10 or of a filling machine.

An optional sealing surface 26 around the dispensing opening 24 seals against the container's mouth 32. This is particularly useful when the liquid filling-material is a carbonated beverage. For embodiments that fill a container 30 that has been sealed against the sealing surface 26, it is useful to provide a return gas channel 44 so that any gas present in the container 30 can escape as the container 30 fills.

An oscillating body 34 extends coaxially with the valve element 18 through the dispensing opening 24 and into the container 30. In the illustrated embodiment, the oscillating body 34 takes the form of a longitudinal rod.

In a preferred embodiment, the oscillating body 34 comprises a piezoelectric element that connects via a connection cable 36 to an interface 38.

In the embodiment described herein, the interface 38 is an excitation and/or measurement device. The term "interface" shall be used to promote conciseness of expression. However, the term "interface" is deemed to cover an excitation device, a measurement device, and an excitation-and-measurement device.

The interface 38 triggers oscillation and carries out measurements during intervals that are short enough to typically be measured in microseconds or milliseconds. The oscillating body 34 and the interface 38 together form a filling-level sensor 35.

The interface 38 connects to an evaluator 40. In some embodiments, each filling element 10 has its own evaluator 40. In others, two or more filling elements 10 of a filling machine share the same evaluator 40.

The filling process begins with a container 30 standing upright on the retainer 28 as shown in FIG. 1. For pressure filling, the container's mouth is sealed against the sealing surface 26 as shown. For free-jet filling, the container 30 is simply placed with its mouth under the dispensing opening 34.

To begin filling, the valve body 18 moves upward to the position shown in FIG. 1. As a result, filling product 37 flows freely through the dispensing opening 24 and forms a filling jet. A filling level inside the container 30 rises as filling proceeds.

As filling proceeds, the interface 38 drives the piezoelectric element so as cause the oscillating body 34 to oscillate at its resonant frequency. The interface 38 drives the oscillating body 34 either continuously or in short bursts.

Eventually, the filling level reaches the lower end of the oscillating body 34. When this happens, the oscillating body's resonant frequency changes abruptly. The interface 38 detects this change. As a result, it is possible to infer that the filling level has reached the oscillating body 34.

In the event that filling proceeds further, the filling level continues to rise. As a result, more of the oscillating body 34 becomes submerged. This further changes the oscillating body's resonant frequency. Again, the interface 38 detects this change.

The evaluator 40 stores a reference frequency that corresponds to a desired filling-level. As soon as the measured resonant frequency reaches this value, the evaluator 40 causes the valve body 18 to move against the valve seat 20, thus closing the filling valve 22. This provides a reproducible way to attain a desired filling level.

The reference frequency can be one that corresponds to when the filling level just grazes the bottom of the oscillating body 34. However, it is also possible for the reference frequency to be selected so that it corresponds to a filling level that is higher up on the oscillating body 34.

FIG. 2 shows an alternative embodiment that has first and second parallel oscillating bodies 34a, 34b. The interface 38 excites these either in phase or out of phase and evaluates the results independently of each other or in conjunction with each other. This provides redundancy that promotes reliability of the level sensor 35. Because of its appearance, the configuration shown in FIG. 2 can be referred to as a "fork" in which the oscillating bodies are tines of the fork.

FIG. 3 shows an alternative embodiment in which a flexible element 46 implements the oscillating body. In one embodiment, it is the interface 38 that provides the stimulus for causing the flexible element 46 to oscillate. Alternatively, the flow of the filling jet itself provides the stimulus to trigger oscillation.

In the case of a flexible element 46, something other than resonant frequency can be relied upon. For example, oscillation of the flexible element 46 may also result in a change in some electrical property, such as resistance or capacitance. In such cases, the filling jet sets the flexible element 46 into oscillation and a connection cable 36 provides a signal to the interface 38 or to a separate measuring device 48 that monitors an end region of the flexible element 46.

The measuring device 48 can be an optical sensor, a magnetic sensor, or any sensor that detects the flexible element's motion. The measuring device 48 can also be arranged centrally in the retainer 28, such that its measuring beam is directed vertically upwards against the flexible element 46. The flexible element be a band or a reasonably thick thread, the movement of which the measuring device 48 detects.

FIG. 4 differs from FIG. 3 only in the formation of the flexible element 46 is elastic enough to undulate into a wave-shaped structure as the filling jet stimulates it along its length.

In the preceding embodiment, the filling jet provided the stimulus for setting the flexible element 46 into oscillation. However, any flow associated with the filling process can also be used. For example, if the flexible element 46 is near the filling jet, movement of gas can be sufficient to trigger oscillation of the flexible element 46. Alternatively, gas escaping the container 30 can also trigger oscillation.

The embodiments described herein are intended to be examples of how to implement the invention and are therefore not intended to be limiting. The scope of the invention is only defined by the following claims.

Having described the invention and a preferred embodiment thereof, what is claimed as new and secured by Letters Patent is:

1. An apparatus comprising a filling element, wherein said filling element comprises a level sensor, a filling-element body, a filling valve, a dispensing opening, an excitation device, an evaluator, and a retainer, wherein said level sensor comprises an oscillating body and a measuring device, wherein said filling-element body comprises a product channel, wherein said filling valve is formed in said filling-element body, wherein said dispensing opening is formed at a lower end of said product channel, wherein said retainer is formed under said dispensing opening for receiving a container, wherein said level sensor extends at least partially vertically below said dispensing opening, wherein a signal from said level sensor actuates said filling valve, wherein said measuring device measures oscillation of said oscillating body, wherein said filling element further comprises a connection cable, wherein said oscillating body comprises a piezoelectric element, and wherein said connection cable connects said oscillating body to said measurement device, and wherein said container stands on said retainer, said apparatus further comprising a filling machine, wherein said filling element is one of a plurality of filling elements of said filling machine and wherein said excitation device and said evaluator are integrated in an electronic circuit that is common to said filling elements such that said excitation device and said evaluator operate in multiplex mode.

2. The apparatus of claim 1, wherein said excitation device is configured to set said oscillating body into oscillation during selected intervals.

3. The apparatus of claim 2, wherein said excitation device excites said oscillating body in bursts.

4. The apparatus of claim 1, further comprising electrical connections between said excitation device and said piezoelectric element, wherein said excitation device is configured to set said oscillating body into oscillation and wherein said measurement device measures a frequency of said oscillation.

5. The apparatus of claim 1, wherein said oscillating body comprises a rod.

6. The apparatus of claim 1, wherein said oscillating body comprises a fork and wherein said excitation device comprises a filling jet.

7. The apparatus of claim 1, wherein said oscillating body extends coaxially through said product channel and below said dispensing opening.

8. The apparatus of claim 1, wherein said oscillating body extends vertically.

9. The apparatus of claim 1, wherein said oscillating body is arranged below said product channel and wherein a filling jet emerging from said dispensing opening fully surrounds said oscillating body.

10. The apparatus of claim 1, further comprising a valve element, wherein said valve element holds said oscillating body such that said oscillating body is axially movable along said product channel.

11. The apparatus of claim 1, wherein said evaluation device connects to said measuring device, wherein said evaluation device comprises a reference memory and a comparator, wherein said reference memory stores data that said comparator compares with a measurement of oscillation to derive an actuation signal for said filling valve.

12. The apparatus of claim 1, wherein said oscillating body extends below said dispensing opening from said product channel.

13. The apparatus of claim 1, further comprising a contact region, wherein said contact region is disposed at a lower end of said filling-element body, wherein said a contact region is arranged for receiving a mouth of a container that is standing on said retainer, and wherein said oscillating body extends vertically below said contact region, and wherein said body comprises a sealing surface around said dispensing opening against which said container's mouth seals.

14. The apparatus of claim 1, wherein said oscillating body comprises a flexible element arranged in a horizontal plane inside said dispensing opening and wherein said measuring device is configured to detect oscillation of said flexible element.

15. The apparatus of claim 14, wherein said measuring device comprises an optical sensor for detecting oscillation of said flexible element.

16. The apparatus of claim 14, wherein said measuring device comprises an acoustic sensor for detecting the oscillation of the flexible element.

17. The apparatus of claim 1, wherein said oscillating body is a first oscillating body and wherein said apparatus further comprises a second oscillating body that is parallel to said first oscillating body, wherein said excitation device sets said first and second oscillating bodies into oscillation, and wherein said evaluator evaluates oscillation of said first and second oscillating bodies.

18. An apparatus comprising a filling element, wherein said filling element comprises a level sensor, a filling-element body, a filling valve, a dispensing opening, and a retainer, wherein said level sensor comprises an oscillating body and a measuring device, wherein said filling-element body comprises a product channel, wherein said filling valve is formed in said filling-element body, wherein said dispensing opening is formed at a lower end of said product channel, wherein said retainer is formed under said dispensing opening for receiving a container, wherein said level sensor extends at least partially vertically below said dispensing opening, wherein a signal from said level sensor actuates said filling valve, and wherein said measuring device measures oscillation of said oscillating body, wherein said oscillating body comprises a flexible element arranged in a horizontal plane inside said dispensing opening, wherein said measuring device is configured to detect oscillation of said flexible element, and wherein said measuring device comprises an acoustic sensor for detecting the oscillation of the flexible element.

19. An apparatus comprising a filling element, wherein said filling element comprises a level sensor, a filling-element body, a filling valve, a dispensing opening, and a retainer, wherein said level sensor comprises an oscillating body and a measuring device, wherein said filling-element body comprises a product channel, wherein said filling valve is formed in said filling-element body, wherein said dispensing opening is formed at a lower end of said product channel, wherein said retainer is formed under said dispensing opening for receiving a container, wherein said level sensor extends at least partially vertically below said dispensing opening, wherein a signal from said level sensor actuates said filling valve, and wherein said measuring device measures oscillation of said oscillating body, wherein said oscillating body is a first oscillating body and wherein said apparatus further comprises an evaluator, an excitation device, and a second oscillating body that is parallel to said first oscillating body, wherein said excitation device sets said first and second oscillating bodies into oscillation, and wherein said evaluator evaluates oscillation of said first and second oscillating bodies.

* * * * *